United States Patent
Parsons

(10) Patent No.: US 10,466,496 B2
(45) Date of Patent: Nov. 5, 2019

(54) COMPACT MULTI-COLOR BEAM COMBINER USING A GEOMETRIC PHASE LENS

(71) Applicant: Facebook Technologies, LLC, Menlo Park, CA (US)

(72) Inventor: Maxwell Parsons, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 44 days.

(21) Appl. No.: 15/833,676

(22) Filed: Dec. 6, 2017

(65) Prior Publication Data

US 2019/0171026 A1    Jun. 6, 2019

(51) Int. Cl.
*G02B 27/12*     (2006.01)
*G02B 1/10*      (2015.01)
(Continued)

(52) U.S. Cl.
CPC ............ *G02B 27/123* (2013.01); *G02B 1/10* (2013.01); *G02B 5/26* (2013.01); *G02B 5/3016* (2013.01); *G02B 5/3083* (2013.01); *G02B 5/32* (2013.01); *G02B 27/0172* (2013.01); *G02B 27/102* (2013.01); *G02B 27/30* (2013.01); *G02B 3/10* (2013.01); *G02B 27/0179* (2013.01); *G02B 27/141* (2013.01); *G02B 27/286* (2013.01); *G02B 2027/014* (2013.01);
(Continued)

(58) Field of Classification Search
CPC ............ G03B 21/2013; G03B 21/2033; G02B 27/00–648; G02B 2027/00–0198; G02B 5/3016; G02B 5/3083; G02B 5/32; G02B 3/00–14; H04N 9/00–9/898
See application file for complete search history.

(56) References Cited

U.S. PATENT DOCUMENTS

| 9,170,436 B2 | 10/2015 | Gibson et al. |
| 2013/0208362 A1* | 8/2013 | Bohn .................. G02B 26/00 359/630 |

(Continued)

FOREIGN PATENT DOCUMENTS

KR    10-20160084416 A    7/2016

OTHER PUBLICATIONS

Facebook Technologies, LLC, International Search Report and Written Opinion, PCT/US2018/064331, dated Apr. 8, 2019, 7 pgs.

*Primary Examiner* — Cara E Rakowski
*Assistant Examiner* — Christopher A Lamb, II
(74) *Attorney, Agent, or Firm* — Morgan, Lewis & Bockius LLP

(57) ABSTRACT

Disclosed is a multi-color light source device including a first light source configured to emit light of a first color, a second light source configured to emit light of a second color that is distinct from the first color, and a first geometric phase lens associated with a first focal length for the light of the first color and a second focal length, distinct from the first focal length, for the light of the second color. The first light source is located at a first distance from the first geometric phase lens, and the second light source is located at a second distance, distinct from the first distance, from the geometric phase lens. Also disclosed is a head mounted display system including the multi-color light source device, a light modulator configured for modulating light from the multi-color light source device, and one or more lenses.

20 Claims, 11 Drawing Sheets

(51) Int. Cl.

| | |
|---|---|
| *G02B 27/01* | (2006.01) |
| *G02B 27/10* | (2006.01) |
| *G02B 27/28* | (2006.01) |
| *G02B 27/30* | (2006.01) |
| *G02B 3/10* | (2006.01) |
| *G02B 5/26* | (2006.01) |
| *G02B 5/30* | (2006.01) |
| *G02B 5/32* | (2006.01) |
| G02B 27/14 | (2006.01) |

(52) U.S. Cl.
CPC ........... *G02B 2027/0112* (2013.01); *G02B 2027/0138* (2013.01); *G02B 2027/0178* (2013.01); *G02B 2027/0185* (2013.01)

(56) References Cited

U.S. PATENT DOCUMENTS

| | | | |
|---|---|---|---|
| 2014/0347608 A1* | 11/2014 | Kato | G02B 27/281 349/96 |
| 2015/0316782 A1* | 11/2015 | Maeda | G03B 21/006 353/20 |
| 2015/0331167 A1 | 11/2015 | Escuti et al. | |
| 2016/0011353 A1 | 1/2016 | Escuti et al. | |
| 2016/0047955 A1* | 2/2016 | Tabirian | G02C 7/022 359/489.07 |
| 2016/0377871 A1* | 12/2016 | Kress | G02B 27/0172 359/567 |
| 2017/0235143 A1 | 8/2017 | Chi et al. | |
| 2018/0120768 A1* | 5/2018 | Christmas | G03H 1/30 |
| 2018/0356639 A1* | 12/2018 | Schaefer | G02B 27/0172 |
| 2019/0227375 A1* | 7/2019 | Oh | G02B 1/00 |

\* cited by examiner

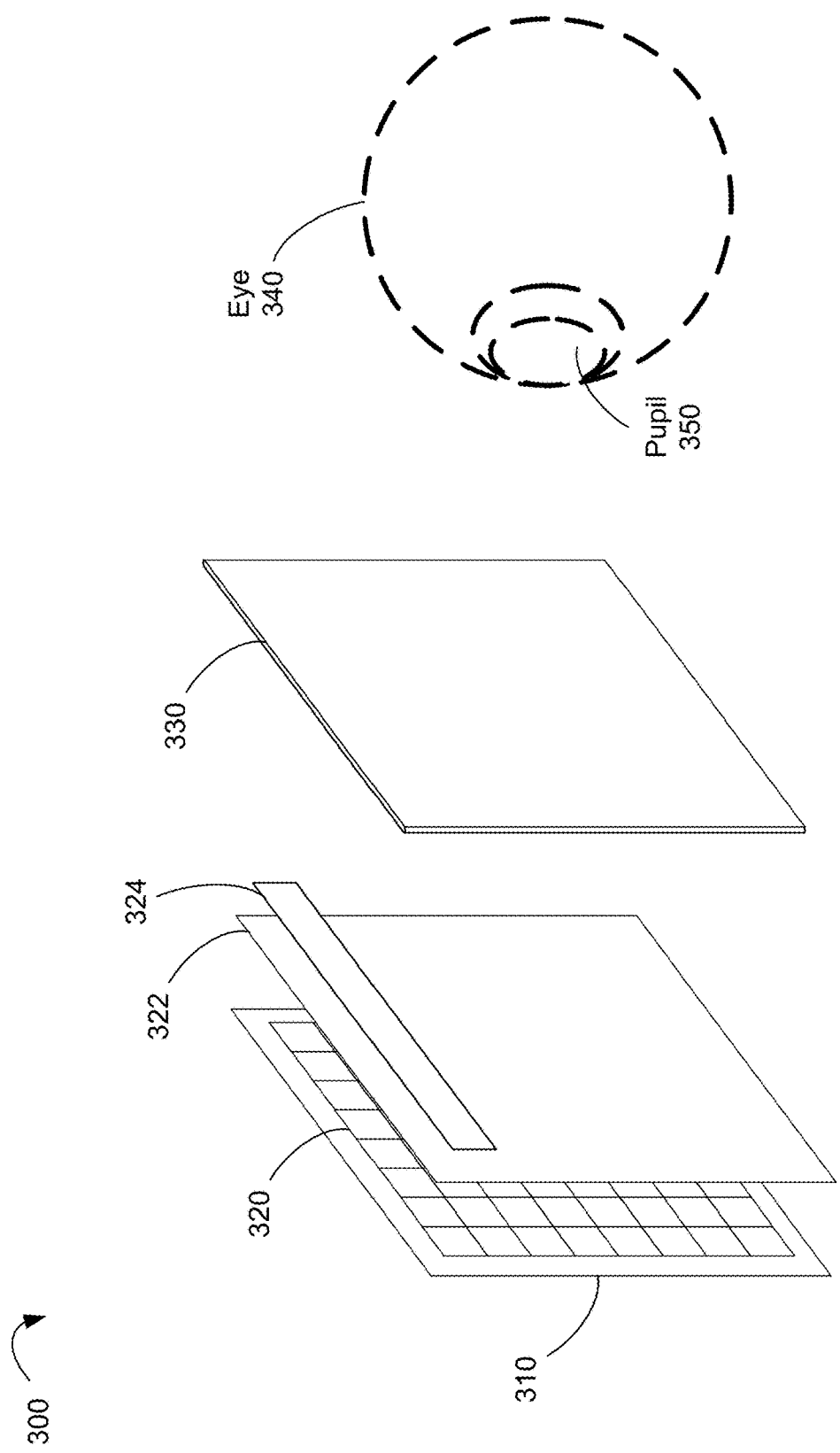

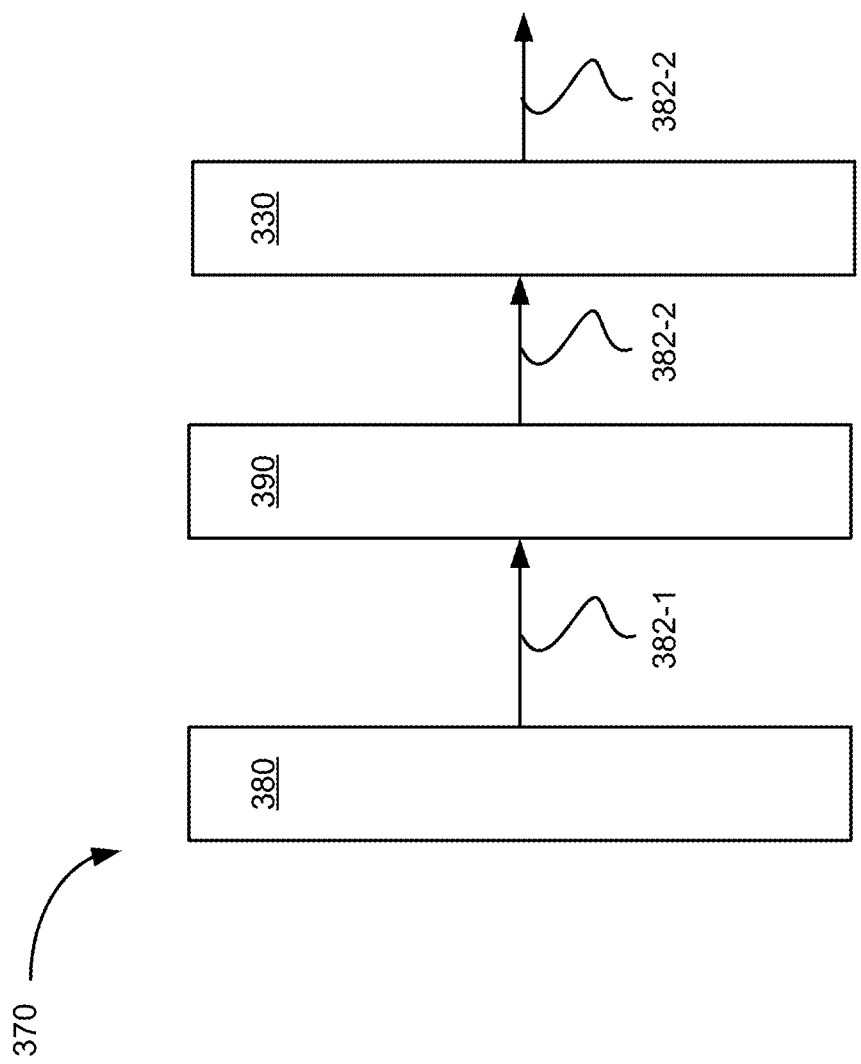

COMPACT MULTI-COLOR BEAM COMBINER USING A GEOMETRIC PHASE LENS

TECHNICAL FIELD

This relates generally to display devices, and more specifically to head-mounted display devices.

BACKGROUND

Head-mounted display devices (also called herein head-mounted displays) are gaining popularity as means for providing visual information to a user.

The use cases of head-mounted display devices include virtual reality and augmented reality, in which computer-generated images or objects are presented to a user. For virtual and augmented reality operations, head-mounted display devices often include light sources and a variety of optical components for modulating the light to be displayed to a user. Such optical components can increase the size and weight of the head-mounted display devices, which can reduce the user satisfaction of such devices.

SUMMARY

Accordingly, there is a need for head-mounted displays that perform virtual reality and augmented reality operations without increased weight and size. Head-mounted display devices generally require multiple light sources for generation and projection of multi-color images (e.g., red, green, and blue light sources). The light generated by the multiple light sources is directed, collimated, and combined to a single beam with a set of optical components. Such optical components can increase the overall size and weight of the device. Therefore, compact light source devices for combining multiple colors into a single, collinear beam are desirable.

The above deficiencies and other problems associated with conventional head-mounted displays are reduced or eliminated by the disclosed display devices. In some embodiments, the devices are head-mounted display devices. In some embodiments, the devices are portable.

In accordance with some embodiments, a multi-color light source device includes a first light source configured to emit light of a first color, a second light source configured to emit light of a second color that is distinct from the first color, and a first geometric phase lens associated with a first focal length for the light of the first color and a second focal length, distinct from the first focal length, for the light of the second color. The first light source is located at a first distance from the first geometric phase lens, and the second light source is located at a second distance, distinct from the first distance, from the geometric phase lens.

In accordance with some embodiments, a head-mounted display device includes the multi-color light source device described above, a light modulator configured for modulating light from the multi-color light source device, and one or more lenses configured for directing modulated light from the light modulator toward an eye of a user.

In accordance with some embodiments, a method includes transmitting, from a first light source, light of a first color through a first geometric phase lens associated with a first focal length for the light of the first color. The method also includes transmitting, from a second light source that is distinct and separate from the first light source, light of a second color that is distinct from the first color through the first geometric phase lens associated with a second focal length, distinct from the first focal length, for the light of the second color. The method further includes transmitting, from a third light source that is distinct and separate from the first light source and the second light source, light of a third color that is distinct from the first color and the second color through the first geometric phase lens associated with a third focal length, distinct from the first focal length and the second focal length, for the light of the third color. The light of the first color, the light of the second color, and the light of the third color, after passing through the first geometric phase lens, are collinearly collimated.

Thus, the disclosed embodiments provide head-mounted display devices including compact multi-color light source devices for collimating and combining light from red, green, and blue light sources into a single collinear collimated beam. Such head-mounted display devices have reduced weight and size, which, in turn, increases user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3A is an isometric view of a display device in accordance with some embodiments.

FIG. 3B is a schematic illustration of a display device in accordance with some embodiments.

Figure 1:
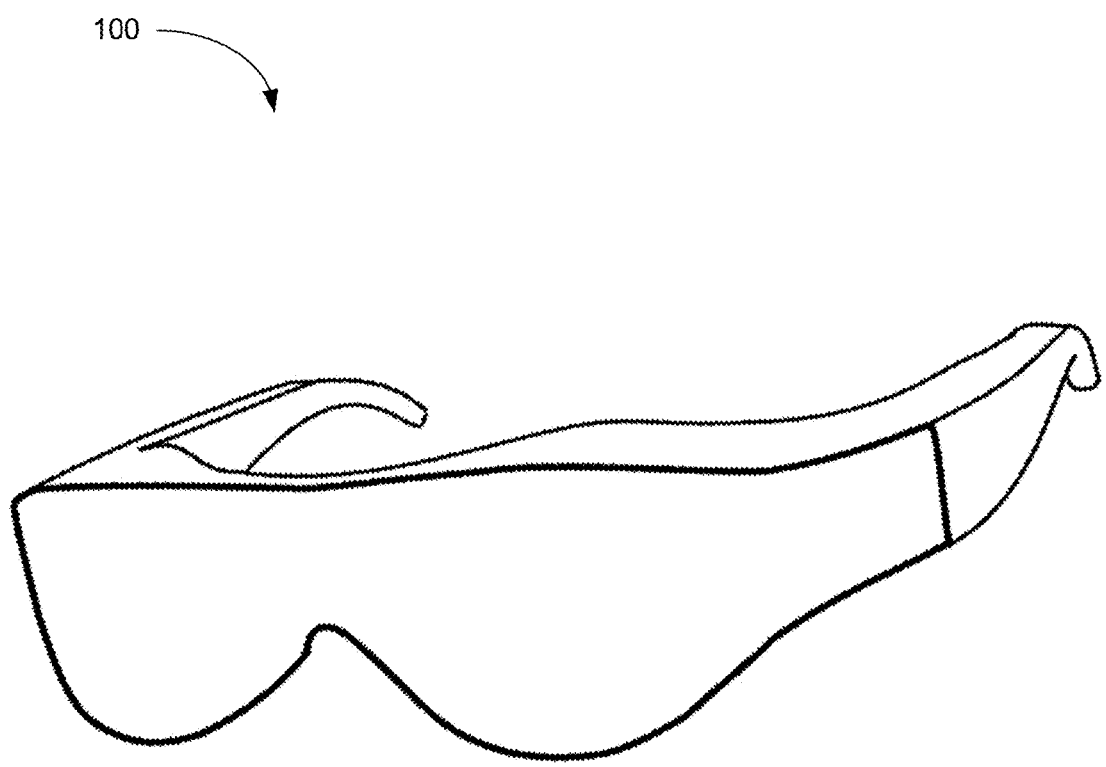
FIG. 1 is a perspective view of a display device in accordance with some embodiments.

These figures are not drawn to scale unless indicated otherwise.

DETAILED DESCRIPTION

Conventional head-mounted display devices for providing augmented and/or virtual reality views include near-eye light field displays that include a display for generating and providing image light through one or more lenses to a user's eyes. Due to the complexity of the optical components required for head-mounted display devices (e.g., lenses, lens assemblies, light sources, light modulators), there is a need for components that are compact and light weight, thereby increasing a user's satisfaction of the device.

For generation and projection of multi-color images, head-mounted display devices typically include multiple light sources (e.g., red, green and blue light sources). Additional optics are required for directing, collimating and combining multi-color light sources for multi-color images. There is a need for compact light source devices for combining multiple colors into a single, collinear light beam.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to obscure aspects of the embodiments unnecessarily.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
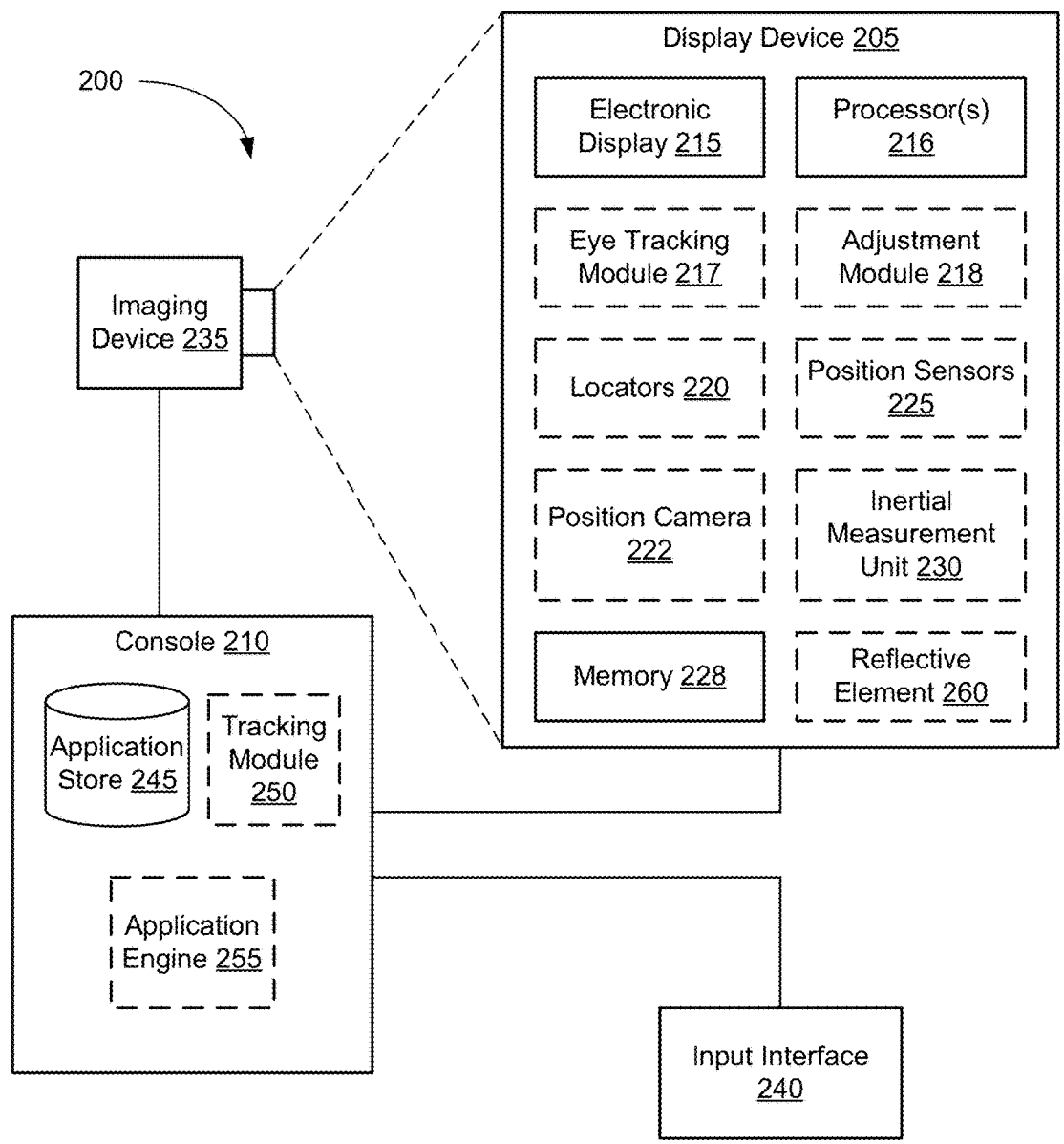
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 can deliver virtual reality, mixed reality, and augmented reality.

In some embodiments, as shown in FIG. 1, display device 205 is a head-mounted display that presents media to a user. Examples of media presented by display device 205 include one or more of images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses, or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules, data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located in proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other and/or additional eye tracking systems may be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, reflections off of the surfaces of the eye may also be used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above. In some embodiments, the eye tracking uses near-infrared light (NIR) instead of IR light.

Adjustment module 218 generates an image frame based on the determined locations of the pupils. In some embodiments, this sends a discrete image to the display that will tile subimages together, thus, a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough not to substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more reflective elements 260. In some embodiments, electronic display device 205 includes a single reflective element 260 or multiple reflective elements 260 (e.g., a reflective element 260 for each eye of a user). In some embodiments, electronic display device 215 projects computer-generated images on one or more reflective elements 260, which then reflects the images toward user's eye. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3A is an isometric view of display device 300 in accordance with some embodiments. In some other embodiments, display device 300 is part of some other electronic display (e.g., digital microscope, a mobile device, a smartphone etc.). In some embodiments, display device 300 includes light emission device array 310, and one or more lenses 330. In some embodiments, display device 300 also includes emission intensity array 322 and IR detector array 324.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

Emission intensity array 322 is configured to selectively attenuate light emitted from light emission array 310. In some embodiments, emission intensity array 322 is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation and/or at some intermediate level of attenuation. In this manner, emission intensity array 322 is able to control what portion of the image light emitted from light emission device array 310 is passed to the one or more lenses 330. In some embodiments, display device 300 uses emission intensity array 322 to facilitate providing image light to a location of pupil 350 of eye 340 of a user, and to minimize the amount of image light provided to other areas in the eyebox.

One or more lenses 330 receive the modified image light (e.g., attenuated light) from emission intensity array 322 (or directly from emission device array 310), and direct the shifted image light to a location of pupil 350.

Optional IR detector array 324 detects IR light that has been retro-reflected from the retina of eye 340, a cornea of eye 340, a crystalline lens of eye 340, or some combination thereof. IR detector array 324 includes either a single IR sensor or a plurality of IR sensitive detectors (e.g., photodiodes). In some embodiments, IR detector array 324 is separate from light emission device array 310. In some embodiments, IR detector array 324 is integrated into light emission device array 310.

In some embodiments, light emission device array 310 and emission intensity array 322 make up a display element. Alternatively, the display element includes light emission device array 310 (e.g., when light emission device array 310 includes individually adjustable pixels) without emission intensity array 322. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

FIG. 3B is a schematic illustration of display device 370 in accordance with some embodiments. Display device 370 includes light source device 380 and light modulator 390. In some embodiments, light source device 380 includes light emission device array 310 described above with respect to FIG. 3A. In some embodiments, light source device 370 includes a light source device described below with respect to FIGS. 4A-4D. Light source device 380 generates image light 382-1 and provides image light 382-1 to light modulator 390. In some embodiments, image light 382-1 includes multiple colors of light (e.g., red, green and blue colors). In some embodiments, image light 382-1 is a single collinear beam combining multiple colors. Light modulator 390 is configured to modulate image light 382-1 from light source device 380. In some embodiments, light modulator 390 includes one or more optical components that condition image light 382-1 from light source device 370. In some embodiments, conditioning image light 382-1 includes, e.g., expanding, collimating, adjusting orientation, some other adjustment of the light, or some combination thereof. The one or more optical components may include, e.g., lenses, liquid lenses, mirrors, apertures, gratings, or some combination thereof. In some embodiments, light modulator 390 includes one or more scanning optical elements configured to steer modulated image light 382-2 (e.g., one or more scanning mirrors such as one or more 2-dimensional MEMS (microelectromechanical systems) mirrors). In some embodiments, light modulator 390 includes or is coupled with an output waveguide including one or more coupling elements and one or more decoupling elements (e.g., the one or more coupling elements and the one or more decoupling elements including diffraction gratings). The one or more coupling and decoupling elements together are configured to guide and expand modulated image light 382-2. The output waveguide expands modulated image light 382-2 in two dimensions and outputs modulated image light 382-2 to an eye of a user (e.g., eye 340 illustrated in FIG. 3A). In some embodiments, expanding modulated image light 382-2 includes pupil replication. In some embodiments, the output waveguide is a waveguide combiner that combines image light 382-2 with ambient light transmitted from outside display device 370 for generation of augmented reality images. In some embodiments, display device 370 optionally includes one or more lenses 330 for transmitting modulated image light 382-2 toward the eye of a user.

Methods and devices for output waveguides and waveguide displays are described in patent application Ser. No. 15/650,612 titled "Temporally Incoherent and Spatially Coherent Source for Waveguide Displays," filed on Jul. 14, 2017, and patent application Ser. No. 15/704,190 titled "Waveguide Display with a Small Form Factor, a Large Field of View, and a Large Eyebox," filed Sep. 14, 2017, the contents of each of which are herein incorporated by reference in their entirety.

In some embodiments, light source device 380 and/or light modulator 390 include one or more processors and/or memory (e.g., one or more processors 216 and/or memory 228 described above with respect to FIG. 2) for storing and execution of instructions for generating and providing images with light source device 380 and/or light modulator 390.

Figure 4A:
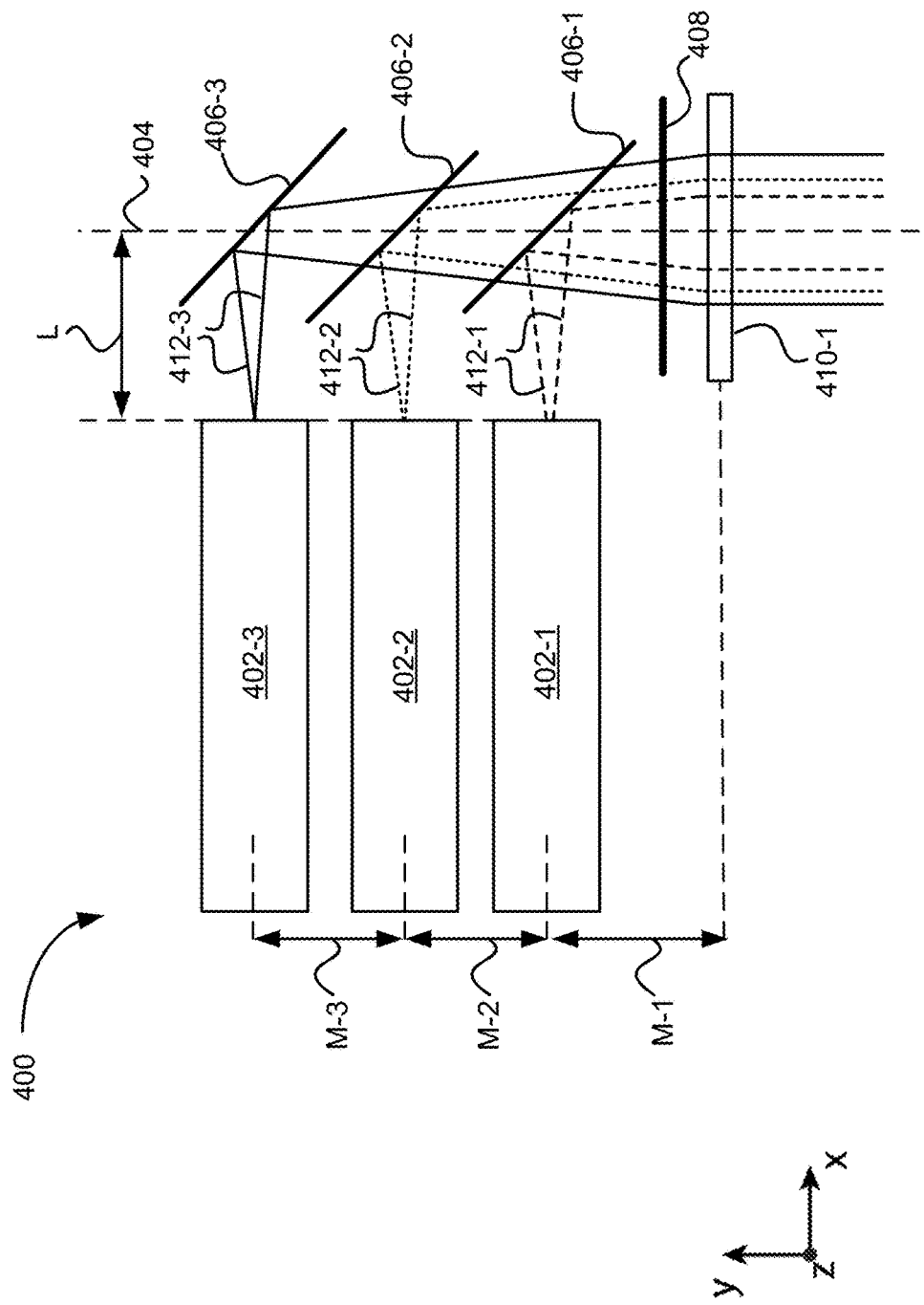
FIG. 4A is a schematic illustration of a light source device in accordance with some embodiments.

FIG. 4A is a schematic illustration of light source device 400 in accordance with some embodiments. Light source device 400 corresponds to light source device 380 described above with respect to FIG. 3B. Light source device 400 collimates and combines light from two or more light sources into a single beam. Light source device 400 includes two or more light sources (e.g., light sources 402-1, 402-2, and 402-3). In some embodiments, light sources 402-1, 402-2, and 402-3 are diode lasers and/or superluminescent light emitting diodes (SLEDs). Light source 402-3 emits blue light (e.g., wavelength ranging between 450 and 470 nm, illustrated with rays 412-3), light source 402-2 emits green light (e.g., wavelength ranging between 510 and 540 nm, illustrated with rays 412-2) and light source 402-1 emits red light (e.g., wavelength ranging between 610 and 650 nm, illustrated with rays 412-1). In some embodiments, light source 412-3 emits blue light with wavelength 450 nm, light source 412-2 emits green light with wavelength 520 nm and light source 412-1 emits red light with wavelength 650 nm. In some embodiments, light source device 400 includes a light source emitting infrared light (e.g., wavelength ranging between 750 and 1000 nm). In some embodiments, light sources 402-1, 402-, and 402-3 are diode lasers with widths (along y direction) ranging from 0.5 mm to 1 mm, and lengths (along x direction) ranging from 0.5 mm to 1 mm. In some embodiments, light sources 402-1, 402-2, and 402-3 are diode lasers with a width of 0.3 mm and a length of 1 mm. Light source device 400 also includes geometric phase lens 410-1. Geometric phase lens 410-1 is associated with distinct focal lengths for distinct colors. Geometric phase lens 410-1 is associated with a first focal length for red, with a second focal length for green and with a third focal length for blue. Geometric phase lens 410-1 and its function is described below with respect to FIGS. 5A and 5B. Geometric phase lens 410-1 defines optical axis 404. Distance L describes the distance along direction x between light sources 402-1, 402-2, and 402-3 and optical axis 404 of geometric phase lens 410-1. In some embodiments, distance L ranges from 0.5 to 4 mm. In some embodiments, distance L is 2 mm. Light source 402-1 is positioned at distance M-1 from geometric phase lens 410-1 along direction y and light source 402-2 is positioned at distance equaling to a sum of M-1 and M-2 from geometric phase lens 410-1 along direction y. Distance M-2 is the distance between light source 402-1 and 402-2. Light source 403-3 is positioned at distance equaling to a sum of M-1, M-2, and M-3 from geometric lens along direction y, where M-3 is the distance between light source 402-2 and light source 402-3. In some embodiments, M-1 ranges from 0.5 mm to 4 mm, M-2 ranges from 0.3 mm to 3 mm, and M-3 ranges from 0.2 mm to 2 mm. In some embodiments, M-1 is 2 mm, M-2 is 0.92 mm, and M-3 is 0.78 mm. The optical distance between geometric phase lens 410-1 and light source 402-1 is defined to be equal to a sum of distances M-1 and L. In some embodiments, the optical distance between geometric phase lens 410-1 and light source 402-1 corresponds to the first focal length of geometric phase lens 410-1 for red color. The optical distance between geometric phase lens 410-1 and light source 402-2 is defined to be equal to a sum of distances M-1, M-2, and L. In some embodiments, the optical distance between geometric phase lens 410-1 and light source 402-2 corresponds to the second focal length of geometric phase lens 410-1 for green color. The optical distance between geometric phase lens 410-1 and light source 402-3 is defined to be equal to a sum of distances M-1, M-2, M-3, and L. In some embodiments, the optical distance between geometric phase lens 410-1 and light source 402-3 corresponds to the third focal length of geometric phase lens 410-1 for blue color. In some embodiments, the optical distances and the focal distances between respective light sources and geometric phase lens 410-1 do not correspond to each other. For example, in some cases the exit pupil of the light sources are not exactly aligned with the outermost edge of the light sources used for defining distance L.

Light sources 402-1, 402-2, and 402-3 emit light a parallel (along direction x), and the light is directed by reflectors 406-1, 406-2, and 406-3 toward geometric phase lens 410-1. In some embodiments, reflectors 406-1, 406-2, and 406-3 have diameters ranging from 1 mm to 6 mm. In some embodiments, the diameter is 2 mm. In some embodiments, reflectors 406-1, 406-2, and 406-3 are dichroic mirrors that selectively reflect light of a range of color while passing through other colors. In FIG. 4A, reflector 406-1 is a dichroic mirror reflecting red light while passing through other colors (e.g., green and blue). Reflector 406-2 is a dichroic mirror reflecting green light while passing through other colors (e.g., blue light). In some embodiments, reflector 406-3 is a dichroic mirror reflecting blue light. Alternatively, in some embodiments, reflector 406-3 is a mirror. Alternatively, in some embodiments, light source 402-3 is positioned so that rays 412-3 emitted by light source 402-3 are projected orthogonally to geometric phase lens 410-1, i.e., light source 402-3 is oriented at 90 degrees and facing towards geometric phase lens 410-1. In such embodiments, reflector 406-3 is omitted and rays 412-3 are transmitted directly through reflector 406-2. In some embodiments, reflectors 406-1, 406-2, and 406-3 could be coupled together to form a reflector array. In some embodiments, the reflector array includes three prisms, each coated with a dichroic surface or a mirror surface, and coupled or attached together (e.g., by an adhesive) to form a monolithic reflector array.

The configuration illustrated in FIG. 4A demonstrates a compact manner of positioning light sources 402-1, 402-2, and 402-3 in parallel (along direction x) with geometric phase lens 410-1. In some embodiments, the overall size of light source device 400 is approximately 5 mm×4 mm×3 mm. Such configuration allows convenient setting of the respective optical distances between light sources 402-1, 402-2, and 402-3 and geometric phase lens 410-1, by adjusting distances M-1, M-2, M-3, and/or L (e.g., adjusting the position of light sources 402-1, 402-2, and 402-3 with respect to geometric phase lens 410-1 along direction x and/or direction y). The optical distance between the exit pupil of light source 402-1 and geometric phase lens 410-1 is equal to a sum of M-1 and L. The optical distance between the exit pupil of light source 402-1 and geometric phase lens 410-1 is equal to a sum of M-1, M-2, and L. The optical distance between the exit pupil of light source 402-3 and geometric phase lens 410-1 is equal to a sum of M-1, M-2, M-3, and L. The positions of light sources 402-1, 402-2, and 402-3 are set so that rays 412-1, 412-2 and 412-3, after passing through geometric phase lens 410-1, are collinearly collimated. In FIG. 4A, light sources 402-1, 402-2, and 402-3 are positioned so that exit pupils of respective light sources are aligned, and the distance L (along direction x) remains the same for each light source. In this configuration, distances M-1, M-2, and M-3 (along direction y) are set to define the respective distances between exit pupils of light sources 402-1, 402-2, and 402-3 and geometric phase lens 410-1. Alternatively, in some embodiments, distance L (along direction x) is set individually to define respective distances between the exit pupils of light sources 402-1, 402-2, and 402-3 and geometric phase lens 410-1. In some embodiments, the positions of light sources 402-1, 402-2, and 402-3 are set along both direction x and y.

Light source device 400 also includes quarter-wave plate 408. Quarter-wave plate 408 is an achromatic quarter-wave plate. In FIG. 4A, quarter-wave plate 408 is positioned on the optical path, between reflectors 406-1, 406-2, and 406-3 and geometric phase lens 410-1. Quarter-wave plate 408 is configured for transmitting rays 412-1, 412-2, and 412-3 emitted by respective light sources 402-1, 402-2, and 402-3 toward geometric phase lens 410-1, prior to rays 412-1, 412-2, and 412-3 impinging on geometric phase lens 410-1. Quarter-wave plate 408 is configured to convert rays 412-1 (red color) having a linear polarization into rays 412-1 having a circular polarization, convert rays 412-2 (green color) having a linear polarization into rays 412-2 having a circular polarization, and convert rays 412-3 (blue color) having a linear polarization into rays 412-2 having a circular polarization. Quarter-wave plate 408 is required to produce circularly polarized light from linearly polarized light emitted by light sources 402-1, 402-2, and 402-3 (e.g., light sources 402-1, 402-2, and 402-3 are laser diodes or SLEDs).

Figure 4B:
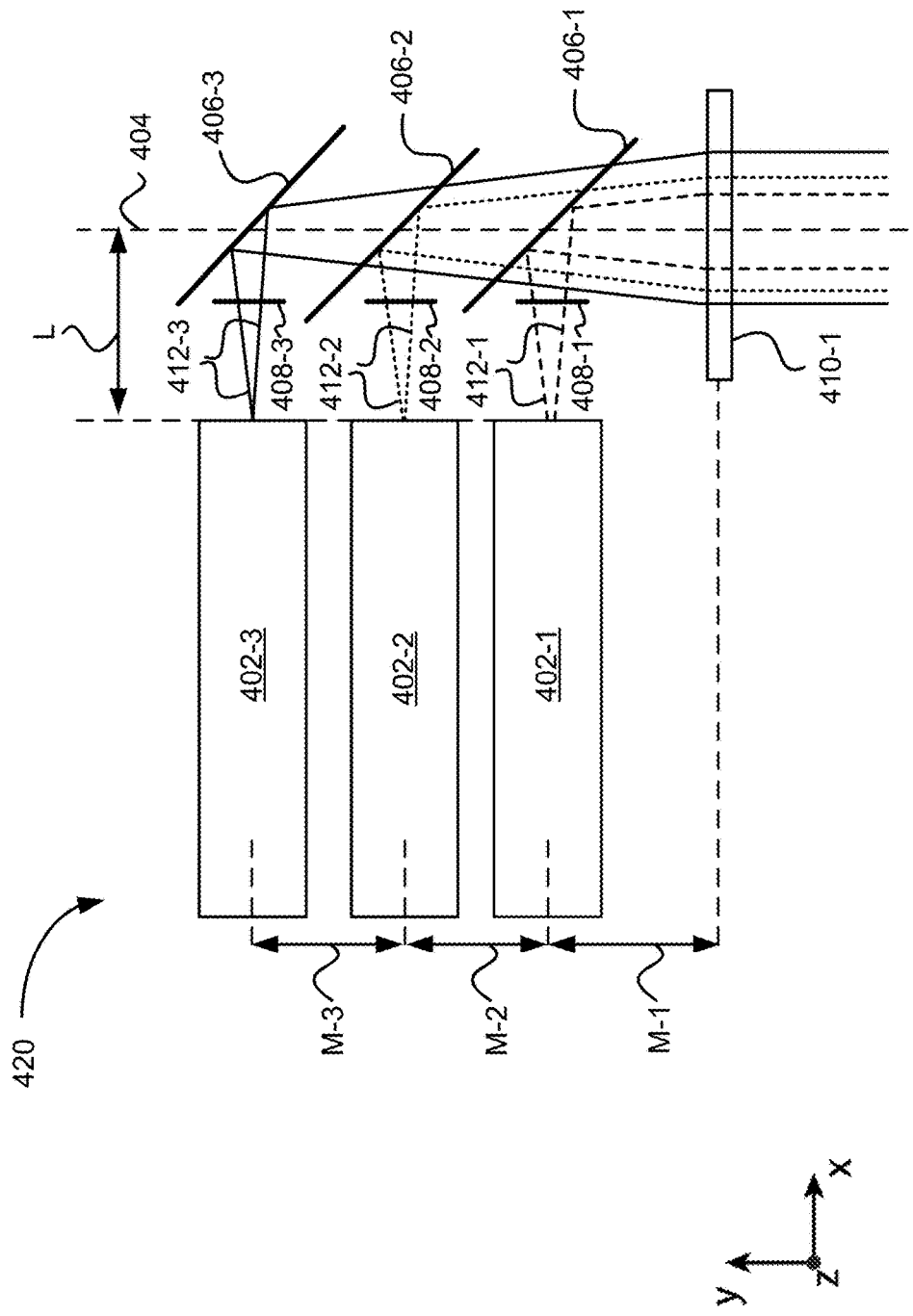
FIG. 4B is a schematic illustration of a light source device in accordance with some embodiments.

In some embodiments, light source device 400 optionally includes an anamorphic prism pair positioned on optical axis 404, after geometric phase lens 410-1, for converting the combined, collinear beam to be rotationally symmetric. FIG. 4B is a schematic illustration of light source device 420 in accordance with some embodiments. Light source device 420 corresponds to light source device 400 described above with respect to FIG. 4A, except that light source device 420 includes single wavelength quarter wave-plates 408-1, 408-2, and 408-3. In FIG. 4B, quarter wave-plate 408-1 is positioned on the optical path between exit pupil of light source 402-1 and reflector 406-1. Quarter wave-plate 408-2 is positioned on the optical path between exit pupil of light source 402-2 and reflector 406-2. Quarter wave-plate 408-3 is positioned on the optical path between exit pupil of light source 402-3 and reflector 406-3. Quarter-wave plate 408-1 is configured to convert rays 412-1 (red color) having a linear polarization into rays 412-1 having a circular polarization. Quarter-wave plate 408-2 is configured to convert rays 412-2 (green color) having a linear polarization into rays 412-2 having a circular polarization. Quarter-wave plate 408-3 is configured to convert rays 412-3 (blue color) having a linear polarization into rays 412-3 having a circular polarization.

Figure 4C:
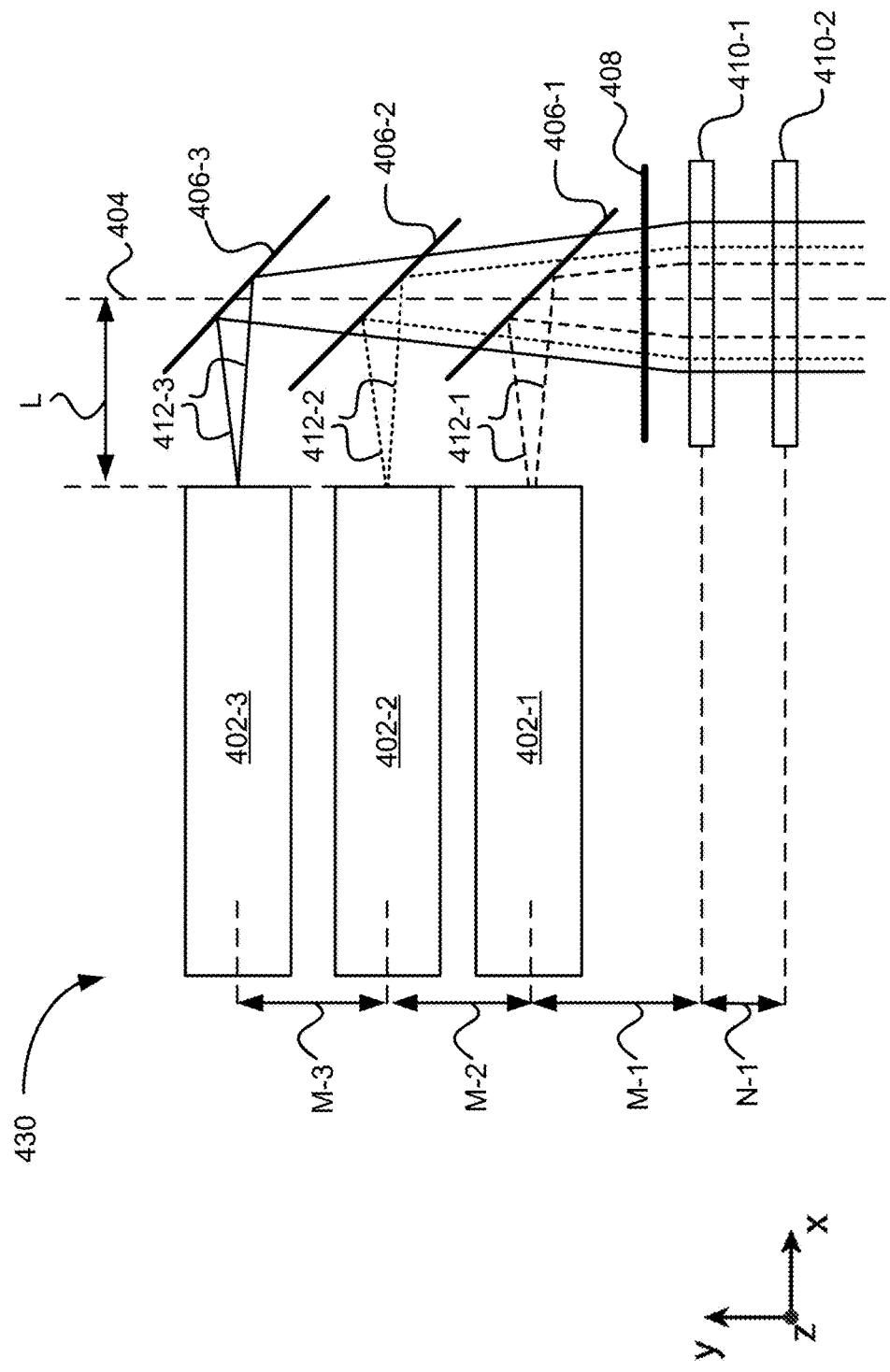
FIG. 4C is a schematic illustration of a light source device in accordance with some embodiments.

FIG. 4C is a schematic illustration of light source device 430 in accordance with some embodiments. Light source device 430 corresponds to light source device 400 described above with respect to FIG. 4A, except that light source device 430 includes two geometric phase lenses, lenses 410-1 and 410-2. Geometric phase lens 410-2 is positioned along optical axis 404, at distance N-1 from geometric phase lens 410-1 and parallel to geometric phase lens 410-1. Geometric phase lens 410-2 is associated with a fourth focal length for red, with a fifth focal length for green, and with a sixth focal length for blue. The optical distance between geometric phase lens 410-2 and light source 402-1 is defined to be equal to a sum of distances N-1, M-1, and L. In some embodiments, the optical distance between geometric phase lens 410-2 and light source 402-1 corresponds to the fourth focal length of geometric phase lens 410-2 for red color. The optical distance between geometric phase lens 410-2 and light source 402-2 is defined to be equal to a sum of distances N-1, M-1, M-2, and L. In some embodiments, the optical distance between geometric phase lens 410-2 and light source 402-2 corresponds to the fifth focal length of geometric phase lens 410-2 for green color. The optical distance between geometric phase lens 410-2 and light source 402-3 is defined to be equal to a sum of distances N-1, M-1, M-2, M-3, and L. In some embodiments, the optical distance between geometric phase lens 410-2 and light source 402-3 corresponds to the sixth focal length of geometric phase lens 410-2 for blue color. In some embodiments, light source device 430 includes a stack of geometric phase lenses (e.g., a stack including three or more geometric phase lenses). Multiple geometric lenses can enhance the focusing efficiency.

Figure 4D:
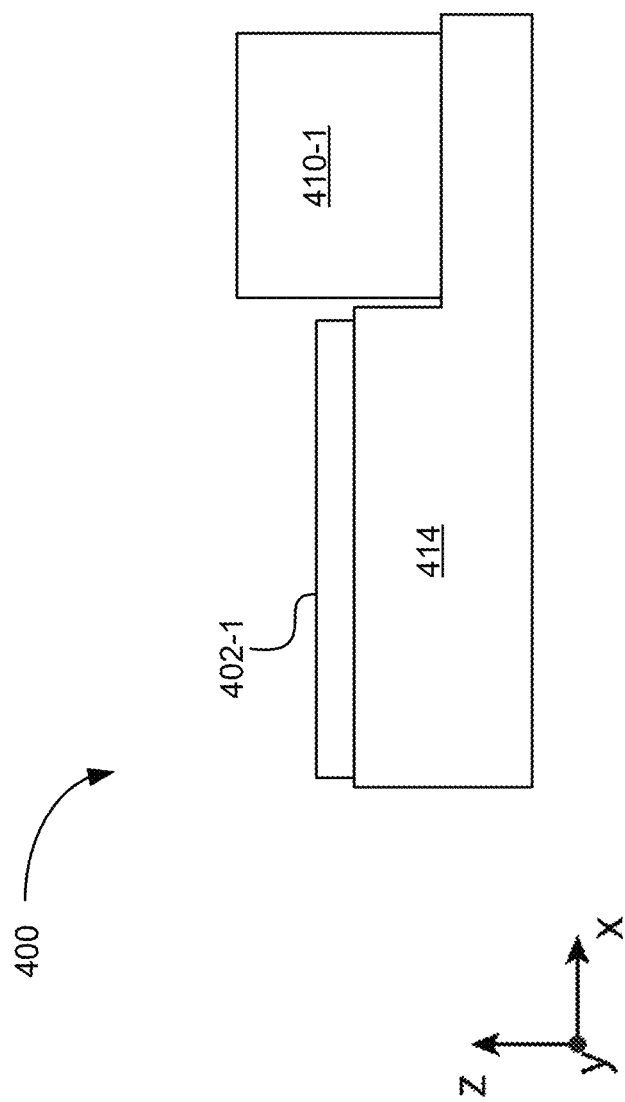
FIG. 4D is a schematic illustration of a side-view of the light source device of FIG. 4A in accordance with some embodiments.

FIG. 4D is a schematic illustration of a side-view of light source device 400 in accordance with some embodiments. FIG. 4D shows geometric phase lens 410-1 and light source 402-1 on mount 414. Mount 414 is configured to secure components of light source device 400 illustrated in FIG. 4A. In some embodiments, mount 414 is included in light source device 400. In some embodiments, mount 400 is separate from light source device 400.

Figure 4E:
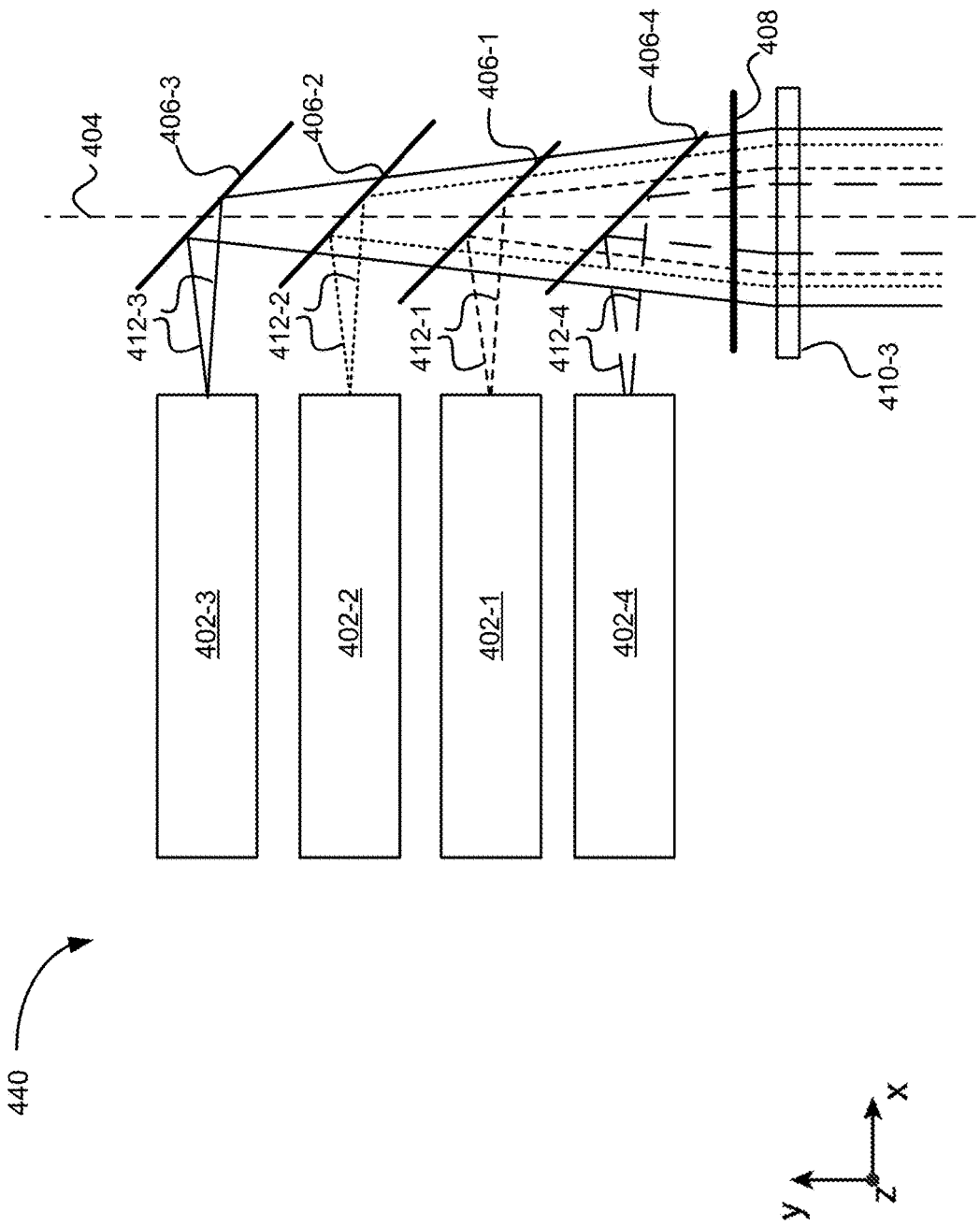
FIG. 4E is a schematic illustration of a light source device in accordance with some embodiments.

FIG. 4E is a schematic illustration of light source device 440 in accordance with some embodiments. Light source device 440 corresponds to light source device 400 described above with respect to FIG. 4A, except that light source device 440 further includes light source 402-4 and reflector 406-4. Light source 402-4 emits near infrared (NIR) light (e.g., wavelength ranging between 750-1400 nm, illustrated with rays 412-4). Reflector 406-4 is a dichroic mirror that selectively reflects light emitted by light source 402-4 while passing through other colors. In FIG. 4E, reflector 406-4 is a dichroic mirror reflecting NIR light while passing through other colors (e.g., red, green, and blue). Geometric phase lens 410-3 corresponds to geometric phase lens 410-1 described above with respect to FIG. 4A, except that geometric lens 410-3 is further associated with a fourth focal length for NIR light emitted by light source 402-4. In some embodiments, the NIR light emitted by light source 402-4 is used for illumination of the eyebox for eye tracking, as described above with respect to FIG. 2. In some embodiments, light source 402-1 emits infrared (IR) light instead of NIR light.

As described above with respect to FIG. 4A, light source device 400 includes a geometric phase lens 410-1. Geometric phase lens 410-1 is an optical half-wave plate with a spatially varying optic axis. In some embodiments, geometric phase lens 400 is a spherical lens, an aspherical lens, a flat lens, or a cylindrical lens. Geometric phase lenses are a desirable choice for imaging optics in a head-mounted display because a single layer geometric phase lens is relatively thin and therefore light weight. In some embodiments, geometric phase lens 410-1 has a diameter ranging from 1 mm to 6 mm. In some embodiments, the diameter is 2 mm. In some embodiments, geometric phase lens 410-1 has a thickness varying between 0.2-1 mm. A geometric phase lens has distinct retardance for light with distinct wavelengths (e.g., geometric phase lens 410-1 has distinct retardance for red, green, and blue lights), which causes color dispersion. The focal length f of a geometric phase lens is determined by the spatial distribution of the optic-axis φ(r) and the wavelength λ of the incident light. In one embodiment, the focal length of a geometric phase lens is linearly proportional to the wavelength λ of the incident light. For example, $$\phi(r) \approx \frac{\pi r^2}{2f\lambda} \quad (1)$$

where r is radius of a circle where the optical axis is located, f is the focal length, π a constant (i.e., commonly approximated as 3.14159); and λ is the wavelength of incident light.

Figure 5A:
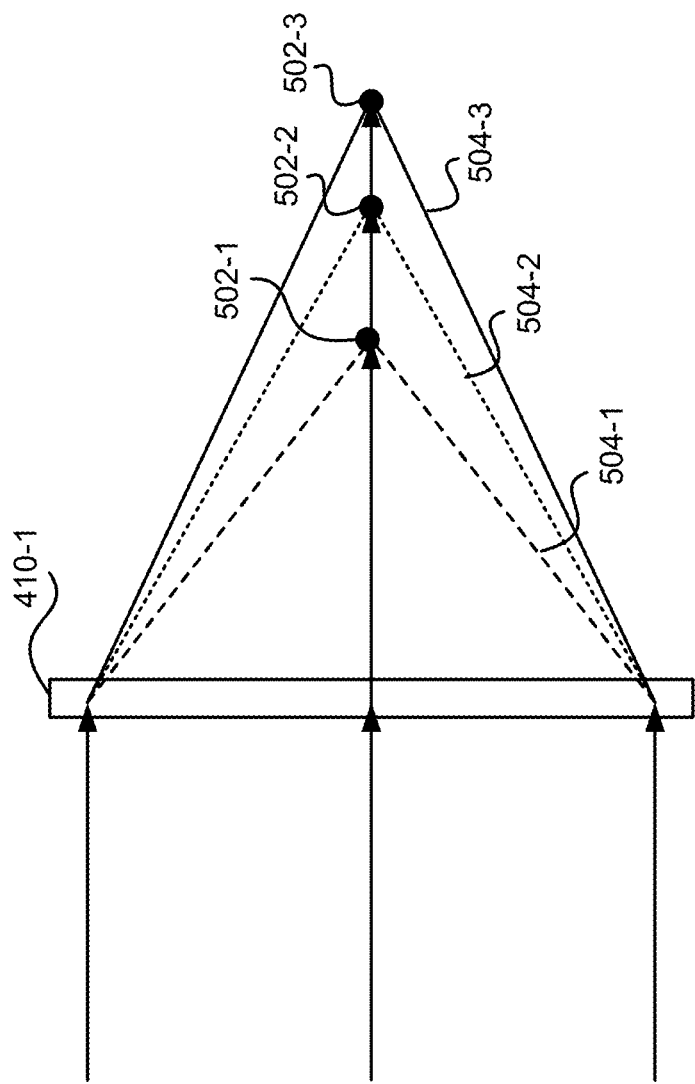
FIG. 5A is a schematic illustration of a geometric phase lens focusing red, green and blue light in accordance with some embodiments.

FIG. 5A is a schematic illustration of geometric phase lens 410-1 focusing red, green, and blue light in accordance with some embodiments. In FIG. 5A, geometric phase lens 410-1 focuses red light 504-1 at focal point 502-1, green light 504-2 at focal point 502-2, and blue light 504-3 at focal point 502-3. The difference in focal lengths is used as an advantage in light source device 400. The different focal distances are used for combining and collimating red, green, and blue light emitted by light sources 402-1, 402-2, and 402-3, respectively, to a single beam.

A geometric phase lens is usually designed for a specific light wavelength. A geometric phase lens adds or removes optical power based in part on a polarization of incident light. For example, if right handed circularly polarized (RCP) light is incident on a geometric phase lens, the geometric phase lens acts as a positive lens (i.e., it causes light to converge), or if left handed circularly polarized (LCP) light is incident on the geometric phase lens, the geometric phase lens acts as a negative lens (i.e., it causes light to diverge). The geometric phase lens may also reverse a handedness of the incident light before outputting it (e.g., changing LCP to RCP or vice versa). If the incident light is at the designed wavelength, LCP light becomes RCP light, or vice versa. If the incident light is not at the designed wavelength, it exits as elliptically polarized light with light leakage due to the non-half-wave thickness for the wavelength of the incident light. Light leakage can affect the quality of an image presented to a user. However, leakage can be minimized by using multiple geometric phase lenses (e.g., geometric phase lenses 410-1 and 410-2 in FIG. 4C). Also the overall focusing efficiency can be increased by multiple geometric phase lenses. Furthermore, due to the light weight and small size of geometric phase lenses used in the current disclosure, the addition of multiple geometric lenses would not significantly increase the size and/or weight of a head mounted display device.

Geometric phase lenses for head mounted display devices are described in further detail in patent application Ser. No. 15/484,422, titled "Geometric Phase Lens Alignment in an Augmented Reality Head Mounted Display," filed Apr. 11, 2017 and Patent Application 62/509,032, titled "Fabrication of Nano-Scale Alignment Patterns for Liquid Crystals to Create Switchable Optical Components," filed on May 19, 2017, the contents of each of which are herein incorporated by reference in their entirety.

Figure 5B:
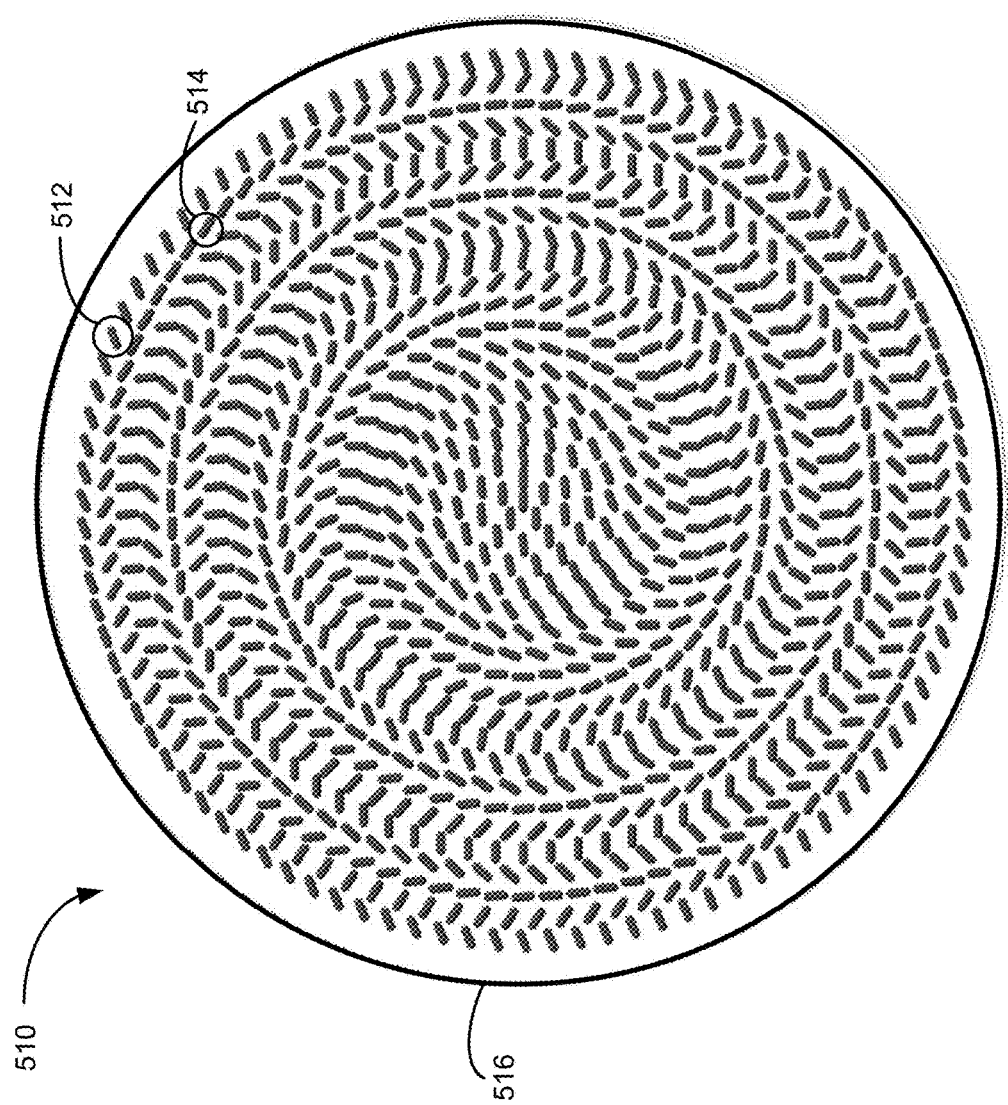
FIG. 5B is a schematic illustration of a geometric phase lens in accordance with some embodiments.

FIG. 5B is a schematic illustration of geometric phase lens 510 in accordance with some embodiments. Geometric phase lens 510 corresponds to geometric phase lens 410-1 described above with respect to FIG. 4A. In some embodiments, geometric phase lens 510 is a flat lens with thickness varying between 0.5-1 mm. In some embodiments, geometric lens 510 is a spherical or aspherical lens. Geometric phase lens 510 includes substrate 516 with a patterned coating. In some embodiments, substrate 516 (e.g., glass) is coated with one or more layers of patterned polymerized liquid crystals. In some embodiments, lens 510 is a metalens including substrate 516 coated with a patterned high refraction index material (e.g., GaP, SiN or $TiO_2$). In some embodiments, the pattern is composed of small substructures (e.g., substructures 512 and 514). Substructure 512 has a first optical axis and substructure 514 has a second optical axis. The second optical axis of substructure 514 is not parallel to the first optical axis of substructure 512. In some embodiments, substructures 512 and 514 act as waveplates. The optical axes of a plurality of substructures rotate across lens 510 to create an appropriate phase profile for focusing light. Such a design provides for light weight and small geometric phase lenses with magnification and numerical aperture (NA) comparable to a conventional and bulky high-NA objective. Such lenses are desirable for head-mounted display devices due to the weight and size limitations of head-mounted display devices.

In some embodiments, substructures 512 and 514 are nanopillars (e.g., nanopillars composed of high refraction index materials). In order to function like a spherical lens, the plurality of nanopillars of lens 510 each are rotated by an angle θ (x, y) following equation:

$$\theta(x, y) = \frac{\pi}{\lambda}\left(f - \sqrt{x^2 + y^2 + f^2}\right) \quad (2)$$

where λ is the wavelength of incident light, f is the focal length, and x and y are the coordinates of each nanopillar. The dimensions of the nanopillars are optimized in order to maximize the polarization conversions efficiency.

In light of these principles, we now turn to certain embodiments of light source devices.

In accordance with some embodiments, a multi-color light source device includes a first light source configured to emit light of a first color, and a second light source configured to emit light of a second color that is distinct from the first color. For example, light source device 400 includes light source 402-1 emitting rays 412-1 of red color and light source 402-2 emitting rays 412-2 of green color in FIG. 4A. The multi-color light source device also includes a first geometric phase lens associated with a first focal length for the light of the first color and a second focal length, distinct from the first focal length, for the light of the second color. For example, light source device 400 includes geometric phase lens 410-1 in FIG. 4A. As shown in FIG. 5A, geometric phase lens 410-1 focuses red light 504-1 at focal point 502-1 and green light 504-2 at focal point 502-2. The first light source is located at a first distance from the first geometric phase lens, and the second light source is located at a second distance, distinct from the first distance, from the geometric phase lens. For example, light source 402-1 is located at an optical distance equaling to a sum of distances M-1 and L from geometric phase lens 410-1. Light source 402-2 is located at an optical distance equaling to a sum of distances M-1, M-2, and L from geometric phase lens 410-1.

In some embodiments, the first light source, the second light source, and the first geometric phase lens are positioned so that the light of the first color and the light of the second color, after passing through the first geometric phase lens, are collinearly collimated. For example, light sources 402-1 and 402-2 are positioned so that respective rays 412-1 and 412-2, after passing through geometric phase lens 410-1, are collinearly collimated in FIG. 4A.

In some embodiments, the first distance corresponds to the first focal length and the second distance corresponds to the second focal length. For example, the optical distance equaling to a sum of distances M-1 and L corresponds to a focal length of geometric phase lens 410-1 for red light in FIG. 4A. The optical distance equaling to a sum of distances M-1, M-2, and L corresponds to a focal length of geometric phase lens 410-1 for green light in FIG. 4A.

In some embodiments, a first portion of the first geometric phase lens corresponds to a first half-wave plate having a first axis and a second portion of the first geometric phase lens corresponds to a second half-wave plate having a second axis that is not parallel to the first axis. For example, geometric phase lens 510 in FIG. 5B illustrates a plurality of substructures (e.g., substructures 512 and 514). Substructure 512 is a half-wave plate having a first optical axis and substructure 514 is a half-plate having a second optical axis. The second optical axis is not parallel to the first optical axis.

In some embodiments, the first geometric phase lens includes a substrate coated with one or more layers of polymerized liquid crystals. For example, geometric phase lens 510 includes substrate 516 with one or more layer of patterned polymerized liquid crystals. In some embodiments, the pattern includes a plurality of substructures (e.g., substructures 512 and 514).

In some embodiments, the first geometric phase lens includes a substrate with a plurality of nanopillars. For example, geometric phase lens 510 includes substrate 516 with a plurality of nanopillars (e.g., substructures 512 and 514) in FIG. 5B.

In some embodiments, the first color is red and the second color is green. For example, light source 402-1 emits red light and light source 402-2 emits green light in FIG. 4A.

In some embodiments, an exit pupil of the first light source is located at the first distance from the first geometric phase lens and an exit pupil of the second light source is located at the second distance from the first geometric phase lens. For example, an exit pupil of light source 402-1 is located at an optical distance equaling to a sum of distances M-1 and L from geometric phase lens 410-1. An exit pupil of light source 402-2 is located at an optical distance equaling to a sum of distances M-1, M-2, and L from geometric phase lens 410-1.

In some embodiments, the multi-color light source device further includes a third light source configured to emit light of a third color that is distinct from the first color and the second color (e.g., light source 402-3 emits blue light in FIG. 4A). The first geometric phase lens is associated with a third focal length, distinct from the first focal length and the second focal length, for the light of the third color (e.g., in FIG. 5A, geometric phase lens 410-1 focuses blue light 504-3 at focal point 502-3). The third light source is located at a third distance, distinct from the first distance and the second distance, from the first geometric phase lens (e.g., light source 402-3 is located at a distance equaling to sum of M-1, M-2, M-3, and L from geometric phase lens 410-1 in FIG. 4A).

In some embodiments, the multi-color light source device further includes two or more dichroic mirrors. The two or more dichroic mirrors include a first dichroic mirror configured to direct light from the first light source toward the first geometric phase lens and a second dichroic mirror configured to direct light from the second light source toward the first geometric phase lens. For example, light source device 400 includes reflectors 406-1 and 406-2 configured to direct respective red light rays 412-1 and green light rays 412-2 toward geometric phase lens 410-1. Reflector 406-1 is a dichroic mirror selectively reflecting red light while passing through other colors. Reflector 406-2 is a dichroic mirror selectively reflecting green light while passing through other colors.

In some embodiments, the multi-color light source device further includes a reflector configured to direct light from the third light source toward the first geometric phase lens. For example, reflector 406-3 is configured to direct blue light rays 412-3 toward geometric phase lens 410-1 in FIG. 4A.

In some embodiments, the first color is red, the second color is green, and the third color is blue (e.g., light source 402-1 emits red light, light source 402-2 emits green light, and light source 402-3 emits blue light in FIG. 4A).

In some embodiments, the multi-color light source device further includes a fourth light source configured to emit light of a fourth color that is distinct from the first color, the second color, and the third color (e.g., light source device 440 includes four light source devices 402-1, 402-2, 402-3, and 402-4 in FIG. 4E). The first geometric phase lens is associated with a fourth focal length, distinct from the first focal length, the second focal length, and the third focal length, for the light of the fourth color (e.g., geometric phase lens 410-3 is associated with a fourth focal length for the light emitted by light source 402-4). The fourth light source is located at a fourth distance, distinct from the first distance, the second distance, and the third distance, from the first geometric phase lens.

In some embodiments, an exit pupil of the first light source is located at the first distance from the first geometric phase lens, an exit pupil of the second light source is located at the second distance from the first geometric phase lens, and an exit pupil of the third light source is located at a third distance, distinct from the first distance and the second distance, from the first geometric phase lens. For example, an exit pupil of light source 402-1 is located at an optical distance equaling to a sum of distances M-1 and L from geometric phase lens 410-1. An exit pupil of light source 402-2 is located at an optical distance equaling to sum of distances M-1, M-2, and L from geometric phase lens 410-1. An exit pupil of light source 402-2 is located at an optical distance equaling to a sum of distances M-1, M-2, M-3, and L from geometric phase lens 410-1.

In some embodiments, the multi-color light source device further includes a quarter-wave plate configured for transmitting the light of the first color from the first light source, the light of the second color from the second light source, and the light of the third color from the third light source prior to the light of the first color, the light of the second color, and the light of the third color impinging on the first geometric phase lens. For example, in FIG. 4A, quarter-wave plate 408 is configured for transmitting rays 412-1, 412-2, and 412-3, emitted by respective light sources 402-1, 402-2, and 402-3, toward geometric phase lens 410-1, prior to rays 412-1, 412-2, and 412-3 impinging on geometric phase lens 410-1.

In some embodiments, the quarter-wave plate is configured to convert the light of the first color having a linear polarization into the light of the first color having a circular polarization, convert the light of the second color having a linear polarization into the light of the second color having a circular polarization, and convert the light of the third color having a linear polarization into the light of the third color having a circular polarization. For example, in FIG. 4A, quarter-wave plate 408 is configured to convert rays 412-1 (red color) having a linear polarization into rays 412-1 having a circular polarization, convert rays 412-2 (green color) having a linear polarization into rays 412-2 having a circular polarization, and convert rays 412-3 (blue color) having a linear polarization into rays 412-2 having a circular polarization.

In some embodiments, the multi-color light source device further includes a first quarter-wave plate, a second quarter-wave plate, and a third quarter-wave plate. The first quarter-wave plate is configured to convert the light of the first color having a linear polarization into the light of the first color having a circular polarization. The second quarter-wave plate is distinct and separate from the first quarter-wave plate, and is configured to convert the light of the second color having a linear polarization into the light of the second color having a circular polarization. The third quarter-wave plate is distinct and separate from the first quarter-wave plate and the second quarter-wave plate, and is configured to convert the light of the third color having a linear polarization into the light of the third color having a circular polarization. For example, light source device 420 in FIG. 4B includes quarter-wave plates 4081, 408-2, and 408-3. Quarter-wave plate 408-1 is configured to convert rays 412-1 (red color) having a linear polarization into rays 412-1 having a circular polarization. Quarter-wave plate 408-2 is configured to convert rays 412-2 (green color) having a linear polarization into rays 412-2 having a circular polarization. Quarter-wave plate 408-3 is configured to convert rays 412-3 (blue color) having a linear polarization into rays 412-3 having a circular polarization.

In some embodiments, the multi-color light source device further includes a second geometric phase lens associated with a fourth focal length for the light of the first color and a fifth focal length, distinct from the fourth focal length, for the light of the second color. The first light source is located at a fourth distance from the second geometric phase lens. The second light source is located at a fifth distance, distinct from the fourth distance, from the second geometric phase lens. For example, light source device 430 in FIG. 4C includes geometric phase lens 410-2. Similarly to as described with respect to geometric phase lens 410-1 in FIG. 5A, geometric phase lens 410-2 is associated with different focal lengths for different wavelengths of color. For example, geometric phase lens 410-2 is associated with a fourth focal length for red, with a fifth focal length for green and with a sixth focal length for blue. The focal lengths of geometric phase lens 410-2 are longer than the respective focal lengths of geometric phase lens 410-1. The optical distance between geometric phase lens 410-2 and light source 402-2 is defined to be equal to a sum of distances N-1, M-1, M-2, and L. In some embodiments, the optical distance between geometric phase lens 410-2 and light source 402-2 corresponds to the fifth focal length of geometric phase lens 410-2 for green color.

In some embodiments, the second geometric phase lens is associated with a sixth focal length, distinct from the fourth focal length and the fifth focal length, for the light of the third color. The third light source is located at a sixth distance, distinct from the fourth distance and the fifth distance, from the second geometric phase lens. For example, the optical distance between geometric phase lens 410-2 and light source 402-3 is defined to be equal to a sum of distances N-1, M-1, M-2, M-3, and L in FIG. 4C. In some embodiments, the optical distance between geometric phase lens 410-2 and light source 402-3 corresponds to the sixth focal length of geometric phase lens 410-1 for blue color.

In accordance with some embodiments, a head-mounted display device includes the multi-color light source device described above, a light modulator configured for modulating light from the multi-color light source device, and one or more lenses configured for directing modulated light from the light modulator toward an eye of a user. For example, display device 370 includes light source device 380, light modulator 390, and one or more lenses 330 in FIG. 3B. Light source device 380 corresponds to light source device 400 in FIG. 4A. Light modulator 390 is configured for modulating image light 382-1 from light source device 380. One or more lenses 330 direct modulated image light 382-2 toward an eye of a user.

In accordance with some embodiments, a method includes transmitting, from a first light source, light of a first color through a first geometric phase lens associated with a first focal length for the light of the first color (e.g., transmitting rays 412-1 emitted by light source 402-1 through geometric phase lens 410-1 in FIG. 4A). The method also includes transmitting, from a second light source that is distinct and separate from the first light source, light of a second color that is distinct from the first color through the first geometric phase lens associated with a second focal length, distinct from the first focal length, for the light of the second color (e.g., transmitting rays 412-2 emitted by light source 402-2 through geometric phase lens 410-1 in FIG. 4A). The method further includes transmitting, from a third light source that is distinct and separate from the first light source and the second light source, light of a third color that is distinct from the first color and the second color through the first geometric phase lens associated with a third focal length, distinct from the first focal length and the second focal length, for the light of the third color (e.g., transmitting rays 412-3 emitted by light source 402-3 through geometric phase lens 410-1 in FIG. 4A). The light of the first color, the light of the second color, and the light of the third color, after passing through the first geometric phase lens, are collinearly collimated (e.g., rays 412-1, 412-2, and 412-3 are collinearly collimated after passing through geometric phase lens 410-1).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A multi-color light source device, comprising:
a first light source configured to emit light of a first color;
a second light source configured to emit light of a second color that is distinct from the first color; and
a first geometric phase lens associated with a first focal length for the light of the first color and a second focal length, distinct from the first focal length, for the light of the second color, wherein:
the first light source is located at a first distance from the first geometric phase lens;
the second light source is located at a second distance, distinct from the first distance, from the geometric phase lens, and
the first light source, the second light source, and the first geometric phase lens are positioned so that the light of the first color and the light of the second color, after passing through the first geometric phase lens, and collinear and have a corresponding divergence.

2. The device of claim 1, wherein:
the first light source, the second light source, and the first geometric phase lens are positioned so that the light of the first color and the light of the second color, after passing through the first geometric phase lens, are collinearly collimated.

3. The device of claim 1, wherein:
the first distance corresponds to the first focal length; and
the second distance corresponds to the second focal length.

4. The device of claim 1, wherein:
a first portion of the first geometric phase lens corresponds to a first half-wave plate having a first axis and a second portion of the first geometric phase lens corresponds to a second half-wave plate having a second axis that is not parallel to the first axis.

5. The device of claim 4, wherein:
the first geometric phase lens includes a substrate coated with one or more layers of polymerized liquid crystals.

6. The device of claim 4, wherein:
the first geometric phase lens includes a substrate with a plurality of nanopillars.

7. The device of claim 1, wherein:
the first color is red; and
the second color is green.

8. The device of claim 1, wherein:
an exit pupil of the first light source is located at the first distance from the first geometric phase lens; and
an exit pupil of the second light source is located at the second distance from the first geometric phase lens.

9. The device of claim 1, further comprising:
a third light source configured to emit light of a third color that is distinct from the first color and the second color, wherein:
the first geometric phase lens is associated with a third focal length, distinct from the first focal length and the second focal length, for the light of the third color; and
the third light source is located at a third distance, distinct from the first distance and the second distance, from the first geometric phase lens.

10. The device of claim 9, further comprising:
two or more dichroic mirrors, including:
a first dichroic mirror configured to direct light from the first light source toward the first geometric phase lens; and
a second dichroic mirror configured to direct light from the second light source toward the first geometric phase lens.

11. The device of claim 10, further comprising:
a reflector configured to direct light from the third light source toward the first geometric phase lens.

12. The device of claim 9, further comprising:
a fourth light source configured to emit light of a fourth color that is distinct from the first color, the second color, and the third color, wherein:
the first geometric phase lens is associated with a fourth focal length, distinct from the first focal length, the second focal length, and the third focal length, for the light of the fourth color; and
the fourth light source is located at a fourth distance, distinct from the first distance, the second distance, and the third distance, from the first geometric phase lens.

13. The device of claim 9, wherein:
an exit pupil of the first light source is located at the first distance from the first geometric phase lens;
an exit pupil of the second light source is located at the second distance from the first geometric phase lens; and
an exit pupil of the third light source is located at a third distance, distinct from the first distance and the second distance, from the first geometric phase lens.

14. The device of claim 9, further comprising:
a quarter-wave plate configured for transmitting the light of the first color from the first light source, the light of the second color from the second light source, and the light of the third color from the third light source prior to the light of the first color, the light of the second color, and the light of the third color impinging on the first geometric phase lens.

15. The device of claim 14, wherein:
the quarter-wave plate is configured to convert the light of the first color having a linear polarization into the light of the first color having a circular polarization, convert the light of the second color having a linear polarization into the light of the second color having a circular polarization, and convert the light of the third color having a linear polarization into the light of the third color having a circular polarization.

16. The device of claim 9, further comprising:
a first quarter-wave plate that is configured to convert the light of the first color having a linear polarization into the light of the first color having a circular polarization;
a second quarter-wave plate that is distinct and separate from the first quarter-wave plate and configured to convert the light of the second color having a linear polarization into the light of the second color having a circular polarization; and
a third quarter-wave plate that is distinct and separate from the first quarter-wave plate and the second quarter-wave plate and configured to convert the light of the third color having a linear polarization into the light of the third color having a circular polarization.

17. The device of claim 1, further comprising:
a second geometric phase lens associated with a fourth focal length for the light of the first color and a fifth focal length, distinct from the fourth focal length, for the light of the second color, wherein:
the first light source is located at a fourth distance from the second geometric phase lens; and the second light source is located at a fifth distance, distinct from the fourth distance, from the second geometric phase lens.

18. The device of claim 17, wherein:

the second geometric phase lens is associated with a sixth focal length, distinct from the fourth focal length and the fifth focal length, for the light of the third color; and the third light source is located at a sixth distance, distinct from the fourth distance and the fifth distance, from the second geometric phase lens.

19. A head-mounted display system, comprising:

the multi-color light source device of claim 1;

a light modulator configured for modulating light from the multi-color light source device; and one or more lenses configured for directing modulated light from the light modulator toward an eye of a user.

20. A method, comprising:

transmitting, from a first light source, light of a first color through a first geometric phase lens associated with a first focal length for the light of the first color;

transmitting, from a second light source that is distinct and separate from the first light source, light of a second color that is distinct from the first color through the first geometric phase lens associated with a second focal length, distinct from the first focal length, for the light of the second color;

transmitting, from a third light source that is distinct and separate from the first light source and the second light source, light of a third color that is distinct from the first color and the second color through the first geometric phase lens associated with a third focal length, distinct from the first focal length and the second focal length, for the light of the third color, whereby the light of the first color, the light of the second color, and the light of the third color, after passing through the first geometric phase lens, are collinear and have a corresponding divergence.

\* \* \* \* \*

UNITED STATES PATENT AND TRADEMARK OFFICE
CERTIFICATE OF CORRECTION

PATENT NO. : 10,466,496 B2  
APPLICATION NO. : 15/833676  
DATED : November 5, 2019  
INVENTOR(S) : Parsons Page 1 of 1

It is certified that error appears in the above-identified patent and that said Letters Patent is hereby corrected as shown below:

In the Claims

Claim 1, Column 21, Line 25, please delete "lens, and" and insert --lens, are--.

Signed and Sealed this  
Fourteenth Day of January, 2020

Andrei Iancu  
*Director of the United States Patent and Trademark Office*